Nov. 6, 1934.    G. G. YOUNG    1,979,924
BAKING RECEPTACLE
Filed Feb. 23, 1932
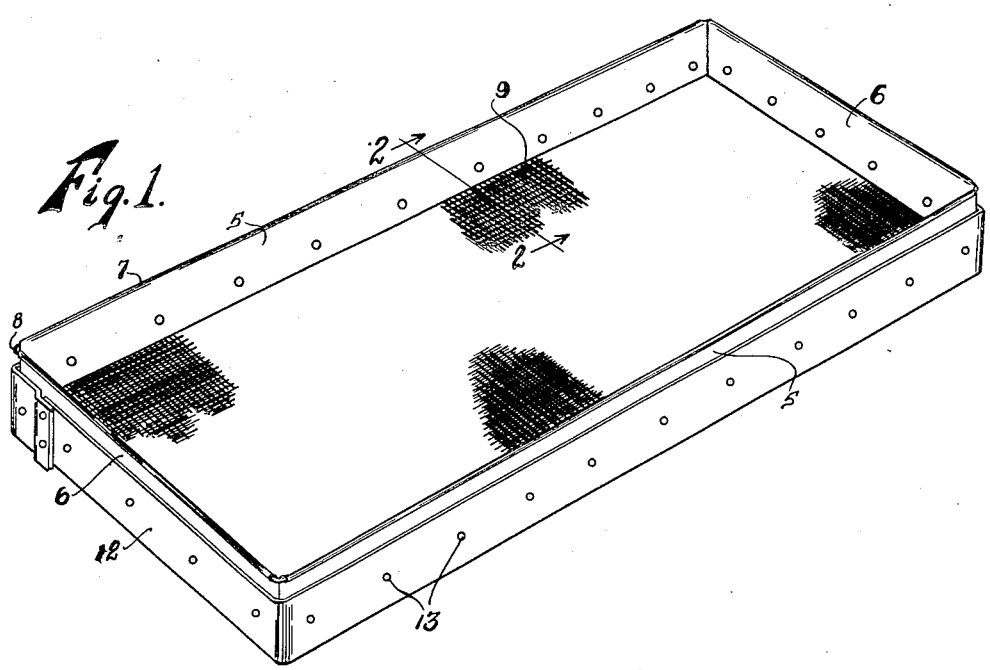
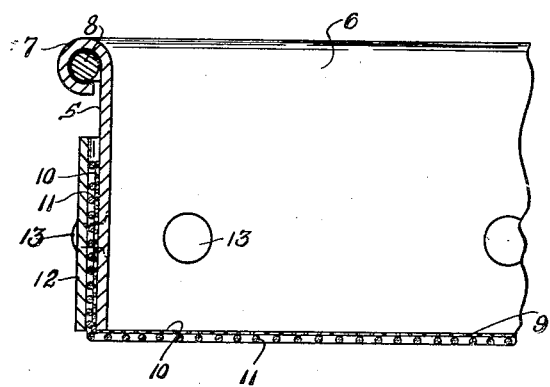
Inventor
George G. Young
By Murray and Zugelter
Attorneys Patented Nov. 6, 1934

1,979,924

UNITED STATES PATENT OFFICE 1,979,924

BAKING RECEPTACLE

George G. Young, Kansas City, Mo., assignor to The Lockwood Manufacturing Company, Cincinnati, Ohio, a corporation of Ohio Application February 23, 1932, Serial No. 594,489

3 Claims. (Cl. 53—6)

This invention relates to a baking receptacle or pan adapted for use in the baking of rye bread and other goods requiring a special baking process.

An object of the invention is to provide such a receptacle which eliminates the necessity for direct hearth-baking of goods of the kind described, and which nevertheless results in no loss of flavor or quality in the loaves produced.

Another object is to provide such a pan or receptacle which makes possible the production of a more efficient type of rye loaf having squared or flat ends permitting cutting thereof in slicing machines.

Another object is to provide such a pan making it possible to produce loaves of a pre-determined length.

Another object is the elimination of a number of time-taking and expensive steps heretofore required.

Another object is the provision of a receptacle of the type set forth which is of simple, durable construction.

These and other objects are attained by the means described herein and illustrated in the accompanying drawing, in which:

Fig. 1 is a perspective view of a receptacle of the present invention.

Fig. 2 is an enlarged cross-sectional view taken on line 2—2 of Fig. 1.

Heretofore, in the baking of rye bread, hard rolls and similar kinds of bakery goods, the ordinary practice has been to bake such articles directly upon the hearth or bottom of the oven since, by general experience, such process only, has resulted in the desired quality or flavor characteristic of such goods. A number of steps additional to the ones used in baking white loaves and the like have been necessary, including the initial dusting of the oven with cornmeal and the cleaning or blowing out of the oven after baking. Moreover, the extra labor required in handling the individual loaves added considerable to the cost of the process in question. In addition to such disadvantages was the fact that the loaves so baked without the use of baking pans, were not of uniform length, and were tapered at their ends whereby, in use, a certain amount of waste resulted, and the employment of slicing machines, constructed to accommodate squared-end loaves, was rendered difficult or impossible.

The present invention obviates these disadvantages by providing a frame constituting the sides and end of a pan and having a bottom formed of a sheet of fine wire mesh supported upon a sheet of coarser wire mesh, both sheets being properly stretched and securely attached to the frame and adapted to rest directly upon the hearth or oven bottom. Baking in such receptacle results in the production of loaves having the desired characteristics that were effected by the old system. The length of the loaves can be controlled by using pans of a desired width and the production of tapered-end loaves may likewise be thus eliminated.

With reference to the drawing: The receptacle may be constructed with separate strips of heavy gage metal forming the sides 5 and the ends 6. The top edges of these strips may be rolled outwardly, as at 7, upon a heavy wire 8, continuous around the sides and ends of the receptacle. The bottom 9 of the receptacle may consist of a sheet 10 of fine wire mesh forming the inner face of the bottom 9, and a sheet 11 of coarser wire mesh, forming the outer face of the bottom and supporting the upper sheet. The lateral and end portions of the two sheets extend beyond the sides and ends of the pan, respectively, and are bent upwardly thereagainst, after the two sheets have been stretched to proper tension. The sheets may be secured by a metal band 12, extending around the outer faces of the pan sides and ends, and by rivets 13, or the like, extending through the band, the sheets and the sides and ends of the receptacle.

In use, the masses of dough are placed transversely of the pan with the ends of such masses in abutment with the sides of the pan whereby loaves of uniform length and squared ends are formed. The desired length of loaf is secured, of course, by use of a pan of proportionate width. The wire mesh pan bottoms are placed in direct contact against a hearth or oven bottom so that the desirable characteristic flavor and qualities heretofore mentioned, are obtained.

What is claimed is:

1. A baking receptacle comprising a frame forming the side and end walls of the receptacle, and provided with a bottom formed of two sheets of wire mesh placed one upon the other, the upper sheet being of fine mesh and the lower sheet of coarser mesh, the edge portions of the sheets being bent upwardly against and secured to the outer faces of the ends and sides of the receptacle, and a continuous band extending around the receptacle covering said up turned edge portions of the sheets, the wire mesh bottom of the receptacle being adapted to be placed in direct contact upon a hearth or oven bottom.

2. A rye bread baking receptacle comprising a flat wire mesh bottom member adapted to seat directly upon a bake oven floor and vertical imperforate upright wall members abutting edgewise on the top face of said mesh wire member and of a height approximating that of the loaf to be baked, said walls serving to produce flat ends and sides on the loaf to be baked in said receptacle.

3. A rye bread baking receptacle comprising an imperforate rectangular frame having upright inside wall faces, a wire mesh bottom member abutting the bottom edge of said frame throughout in a common plane, said mesh bottom member having its sides turned upwardly about the exterior faces of said frame member and means securing said sides to said frame member about the exterior of the receptacle.

GEORGE G. YOUNG.